No. 759,893. PATENTED MAY 17, 1904.
M. KNUTSEN.
MEAT TENDERER AND VEGETABLE CUTTER.
APPLICATION FILED AUG. 22, 1903.
NO MODEL.
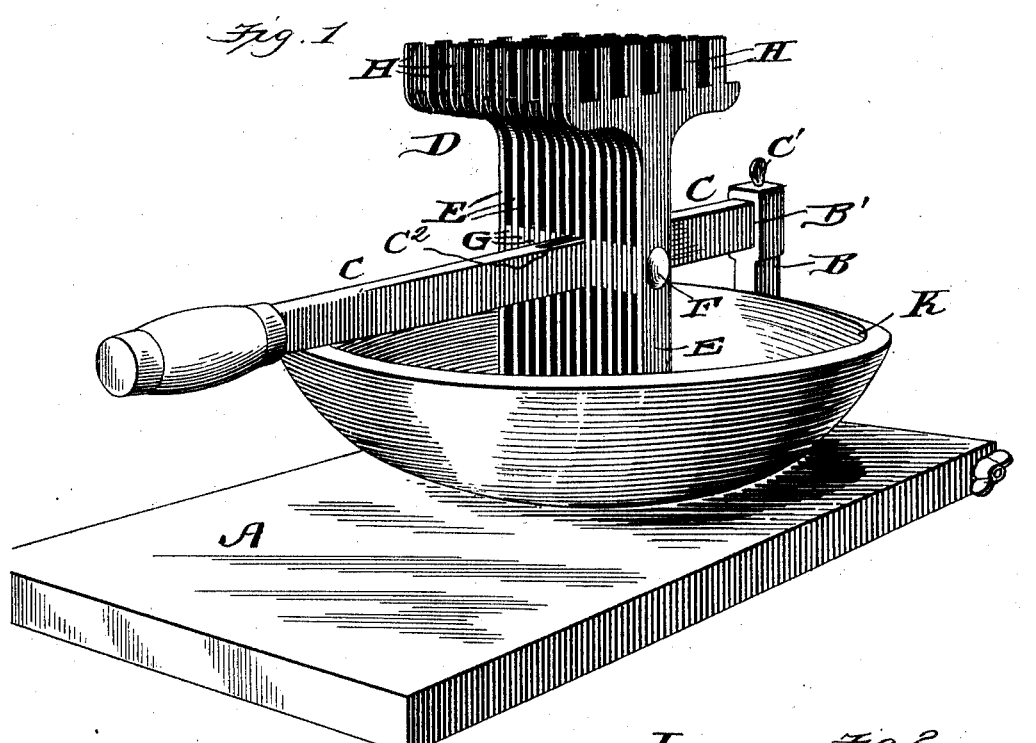
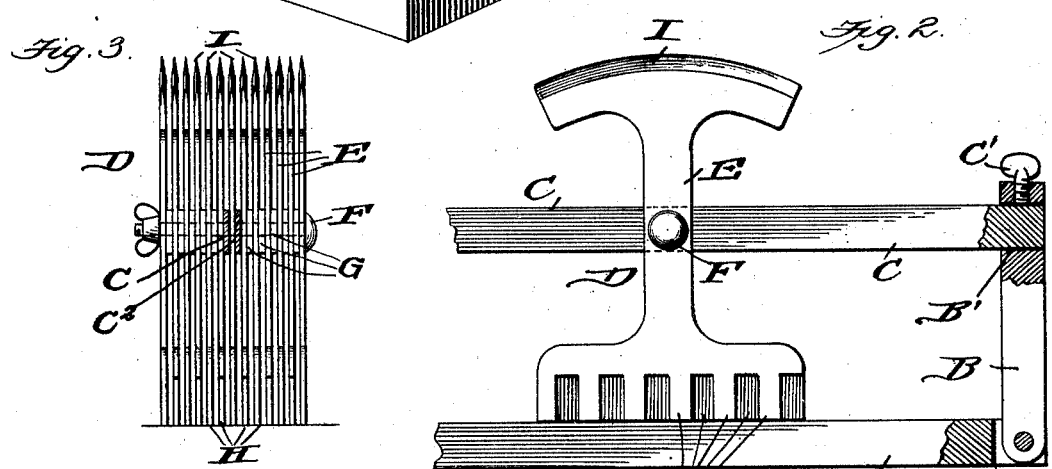
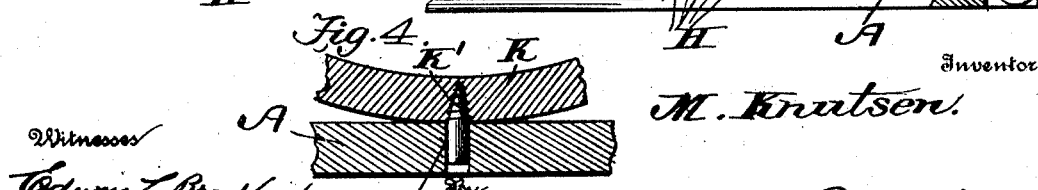

No. 759,893. Patented May 17, 1904.

UNITED STATES PATENT OFFICE.

MARTIN KNUTSEN, OF FRESNO, CALIFORNIA.

MEAT-TENDERER AND VEGETABLE-CUTTER.

SPECIFICATION forming part of Letters Patent No. 759,893, dated May 17, 1904.

Application filed August 22, 1903. Serial No. 170,483. (No model.)

*To all whom it may concern:*

Be it known that I, MARTIN KNUTSEN, a citizen of the United States, residing at Fresno, in the county of Fresno and State of California, have invented a new and useful Meat-Tenderer and Vegetable-Cutter, of which the following is a specification.

This invention is a combined meat-tenderer and vegetable-cutter, the object being to provide a simple and efficient device by means of which a steak or other form of meat can be quickly and easily made tender and also a device by means of which vegetables can be sliced or chopped into fine bits as required.

The invention consists, essentially, of the base, having a standard at one end thereof, a handle rigidly secured to the upper end of the standard, said handle carrying a plurality of blades, said blades having teeth at one end and a cutting edge at the opposite end, a bowl being preferably arranged upon the base for the purpose of holding the material being operated upon, said bowl being rotatable upon the base.

The invention consists also in certain details of construction hereinafter fully described, and pointed out in the claim.

In the drawings forming part of this specification, Figure 1 is a perspective view showing the practical application of my invention. Fig. 2 is a side elevation partly in section and showing the base, standard, handle, and chopping-blades. Fig. 3 is a face view of the chopper, the handle being shown in section. Fig. 4 is a detail view illustrating the pivotal connection between the base and bowl.

In carrying out my invention I employ a flat base A, to the rear end of which is pivoted a standard B, said standard having an opening B' adjacent its upper end and in which fits the rear end of the handle C, said end being secured by means of a set-screw C', which passes through the end of the standard and binds upon the handle, thereby securely holding it in place. The handle carries the combined chopper and pounder D, which consists of a series of blades E, mounted upon a bolt F, which passes transversely through the handle and through the central portion of the blade, the blades being spaced apart by means of interposed washers G. One end of each blade is formed with a series of teeth H, while the opposite end of the blade is provided with a cutting edge I, said cutting edge being preferably made upon the arc of a circle, as indicated. In practice I prefer to have the teeth of the blades alternate, and by that I mean to have the teeth of one blade directly opposite the notch or intervening space of the next adjacent blades. The combined chopper and pounder is easily reversible, it being only necessary to remove the set-screw C', withdraw the handle from the standard, reverse it, and again connect it to the standard. The material to be pounded or chopped is preferably arranged in a bowl K, which has a central pin K' fitting into a recess $K^2$, produced in the base, and while the material is being pounded or chopped the bowl can be turned so as to present every portion of the material to the chopping or pounding surface. The standard being pivoted to the end of the base, it is obvious that the combined pounder and chopper will have a sufficient movement by working the handle up and down.

It will thus be seen that I provide an exceedingly cheap, simple, and efficient construction of combined meat-tenderer and vegetable-slicer.

I may state that in practice the handle is provided with a longitudinal slot $C^2$, through which the center blade is passed, so that where an odd number of blades are used the same number may be arranged upon each side of the handle.

Having thus fully described my invention, what I claim as new, and desire to secure by Letters Patent, is—

A device of the kind described comprising a base, a standard pivoted to one end of the base, a handle connected to the said standard, a plurality of blades connected to the handle, each blade being provided with a series of teeth at one end, and a cutting edge at the opposite end, substantially as described.

MARTIN KNUTSEN.

Witnesses:
JAS. E. FABER,
G. W. COLE.